United States Patent
Kobayashi et al.

(10) Patent No.: US 11,136,423 B2
(45) Date of Patent: *Oct. 5, 2021

(54) MODIFIED POLYTETRAFLUOROETHYLENE FINE POWDER AND METHOD FOR ITS PRODUCTION, AND METHOD FOR PRODUCING TUBE OR HOSE

(71) Applicants: AGC Inc., Chiyoda-ku (JP); AGC CHEMICALS EUROPE, LIMITED, Lancashire (GB)

(72) Inventors: Shigeki Kobayashi, Chiyoda-ku (JP); Ariana Claudia Morgovan-Ene, Lancashire (GB); Anthony Eugene Wade, Lancashire (GB)

(73) Assignees: AGC Inc., Chiyoda-ku (JP); AGC CHEMICALS EUROPE, LIMITED, Lancashire (GB)

(*) Notice: Subject to any disclaimer, the term of this patent is extended or adjusted under 35 U.S.C. 154(b) by 590 days.

This patent is subject to a terminal disclaimer.

(21) Appl. No.: 15/915,727

(22) Filed: Mar. 8, 2018

(65) Prior Publication Data

US 2018/0194884 A1 Jul. 12, 2018

Related U.S. Application Data

(63) Continuation of application No. PCT/JP2016/076030, filed on Sep. 5, 2016.

(30) Foreign Application Priority Data

Sep. 8, 2015 (JP) .............................. JP2015-176810

(51) Int. Cl.
 C08F 214/26 (2006.01)
 B29C 48/00 (2019.01)
 (Continued)

(52) U.S. Cl.
 CPC ........ C08F 214/262 (2013.01); B29C 48/022 (2019.02); B29C 48/06 (2019.02);
 (Continued)

(58) Field of Classification Search
 CPC ..... C08F 214/262; C08F 2/26; C08J 2327/18; C08J 3/16
 See application file for complete search history.

(56) References Cited

U.S. PATENT DOCUMENTS 4,262,101 A * 4/1981 Hartwimmer ....... C08F 214/262
 526/89
4,529,784 A 7/1985 Finlay
 (Continued)

FOREIGN PATENT DOCUMENTS

EP 3 287 474 A1 2/2018
JP 60-44511 3/1985
 (Continued)

OTHER PUBLICATIONS

International Search Report dated Oct. 11, 2016 in PCT/JP2016/076030, filed on Sep. 5, 2016.

*Primary Examiner* — Michael A Salvitti
(74) *Attorney, Agent, or Firm* — Oblon, McClelland, Maier & Neustadt, L.L.P.

(57) ABSTRACT

To provide a modified polytetrafluoroethylene which is excellent in the moldability by paste extrusion and the mechanical property of the molded article. A modified polytetrafluoroethylene fine powder which is a fine powder of a non-melt-moldable modified polytetrafluoroethylene, characterized in that the modified polytetrafluoroethylene comprises units derived from tetrafluoroethylene, units derived from a perfluoroalkyl vinyl ether represented by $CF_2=CFO-C_nF_{2n+1}$ (wherein n is an integer of from 1 to 6), and units derived from a perfluoroalkylethylene represented by $CH_2=CH-C_mF_{2m+1}$ (wherein m is an integer of
 (Continued)

from 3 to 6), and that the content of the units derived from the perfluoroalkyl vinyl ether is from 0.1 to 0.25 mass % and the content of the units derived from a perfluoroalkylethylene is from 0.001 to 0.1 mass %, based on all monomer units in the modified polytetrafluoroethylene.

11 Claims, 1 Drawing Sheet

(51) Int. Cl.
  *B29C 48/09* (2019.01)
  *C08F 2/26* (2006.01)
  *B29C 48/32* (2019.01)
  *B29C 48/95* (2019.01)
  *B29C 48/06* (2019.01)
  *C08J 3/16* (2006.01)
  *F16L 11/04* (2006.01)
  *B29K 27/18* (2006.01)
  *B29K 105/00* (2006.01)

(52) U.S. Cl.
  CPC .............. *B29C 48/09* (2019.02); *B29C 48/32* (2019.02); *B29C 48/95* (2019.02); *C08F 2/26* (2013.01); *C08J 3/16* (2013.01); *F16L 11/04* (2013.01); *B29K 2027/18* (2013.01); *B29K 2105/007* (2013.01); *C08J 2327/18* (2013.01)

(56) References Cited

U.S. PATENT DOCUMENTS

| | | | | |
|---|---|---|---|---|
| 4,792,594 A * | 12/1988 | Gangal | ................. | C08F 214/26 526/253 |
| 5,176,958 A * | 1/1993 | Shimizu | .............. | C08F 214/262 428/402 |
| 5,530,078 A * | 6/1996 | Felix | ................... | C08F 214/262 526/91 |
| 5,731,394 A * | 3/1998 | Treat | ................... | C08F 214/262 526/206 |
| 7,531,611 B2 * | 5/2009 | Sabol | .................... | C08F 214/26 428/502 |
| 2003/0004277 A1 | 1/2003 | Schmiegel et al. | | |
| 2005/0277740 A1 | 12/2005 | Paglia et al. | | |
| 2009/0197028 A1 | 8/2009 | Lyons et al. | | |
| 2010/0016511 A1 | 1/2010 | Oriani | | |
| 2010/0069554 A1 | 3/2010 | Oriani | | |
| 2018/0037689 A1 * | 2/2018 | Kobayashi | ............... | H01B 7/02 |
| 2018/0194884 A1 * | 7/2018 | Kobayashi | ............... | C08F 2/26 |

FOREIGN PATENT DOCUMENTS

| | | |
|---|---|---|
| JP | 10-53624 | 2/1998 |
| JP | 11-509245 | 8/1999 |
| JP | 2004-526048 | 8/2004 |
| JP | 2008-502789 | 1/2008 |
| JP | 2011-511133 | 4/2011 |
| JP | 2011-528401 | 11/2011 |
| JP | 2012-503074 | 2/2012 |
| RU | 2 141 488 C1 | 11/1999 |

\* cited by examiner

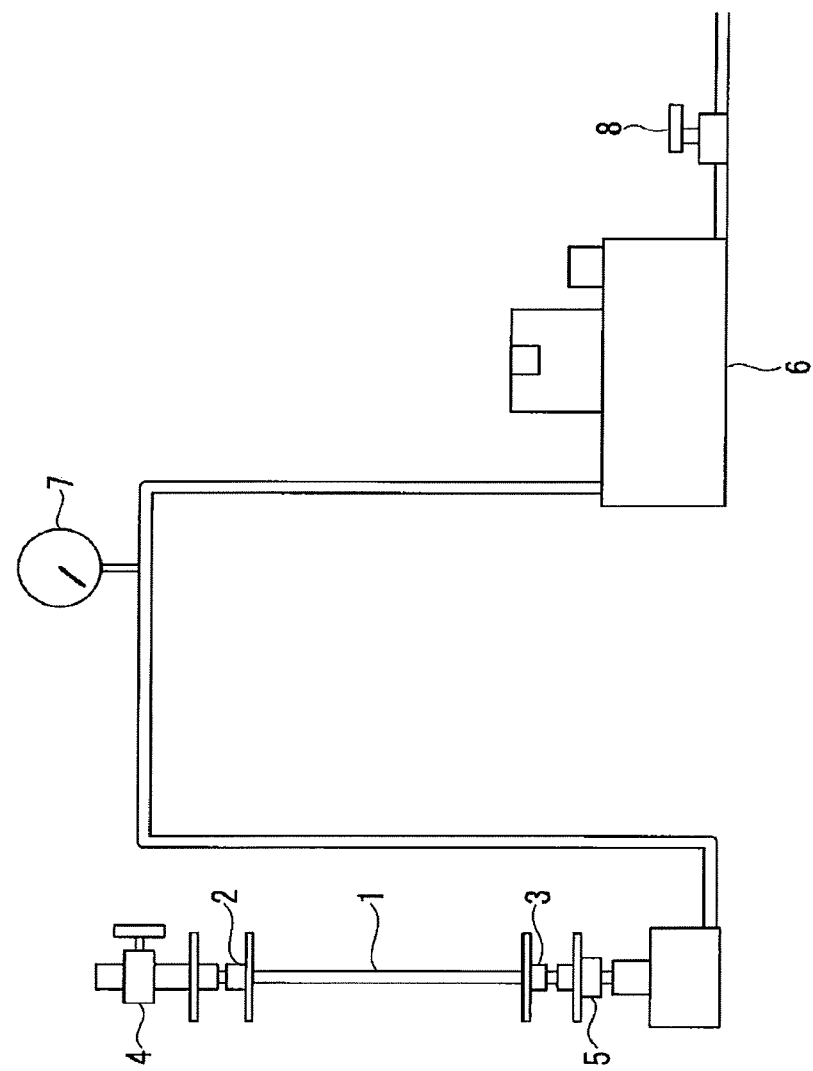

MODIFIED POLYTETRAFLUOROETHYLENE FINE POWDER AND METHOD FOR ITS PRODUCTION, AND METHOD FOR PRODUCING TUBE OR HOSE

TECHNICAL FIELD

The present invention relates to a modified polytetrafluoroethylene fine powder and a method for its production, and a method for producing a tube or a hose by using the modified polytetrafluoroethylene fine powder.

BACKGROUND ART

A fine powder of polytetrafluoroethylene (hereinafter referred to also as "PTFE") is produced by a method such that tetrafluoroethylene (hereinafter referred to also as "TFE") is polymerized by an emulsion polymerization method in which polymerization is carried out with an emulsifier in an aqueous medium to obtain an aqueous emulsion of PTFE fine particles, followed by coagulating the PTFE fine particles.

Conventionally, ammonium perfluorooctanoate ($CF_3(CF_2)_6COONH_4$, hereinafter referred to as APFO) having 8 carbon atoms was used as a fluorinated emulsifier for emulsion polymerization of TFE. However, APFO is not present in the natural world and is a hardly decomposable substance, and further, there is a problem that its bioaccumulation property is high. For this reason, in recent years, it has been recommended to use a fluorinated emulsifier having a bioaccumulation property lower than that of APFO in consideration of the environment.

PTFE has an extremely high melt viscosity, and therefore it is not possible to use, as its molding method, a melt molding method such as an extrusion molding to be applied for ordinary thermoplastic resins. Thus, a paste extrusion molding method is employed in which a fine powder of PTFE is mixed with a lubricant and extruded. As a molded product formed by the paste extrusion molding method, a coating of an electric wire, a tube, a hose and a sealing material may, for example, be mentioned.

In particular, a tube or a hose is used, as a flexible pipe requiring flexibility, for an oil pressure control system, a fuel supply pipe, a high pressure steam pipe, a chemical liquid transfer hose, and the like. Since a tube or a hose must avoid leakage due to breakage, a good mechanical property, especially a pressure resistance performance, is required.

For this reason, a PTFE fine powder is required to have a good moldability in a paste extrusion molding and a molded article after sintering is required to be excellent in an appearance and a mechanical property.

In order to improve the moldability in paste extrusion molding of PTFE and the mechanical property of the molded article, a method for modifying PTFE by using a small amount of a comonomer copolymerizable with TFE to form a modified PTFE fine powder has been known.

Patent Document 1 relates to a modified PTFE fine powder suitable for producing a tube and a hose. Example describes an example in which the modified PTFE fine powder is produced by copolymerizing TFE and perfluoropropyl vinyl ether (hereinafter also referred to as "PPVE") by emulsion polymerization using APFO.

Patent Document 2 relates to a coating material for an electric wire having a good adhesion to a wire. As comonomers to be copolymerized with TFE, 0.01 to 0.5 mass % of perfluoroalkylethylene and a trace amount of perfluoroalkyl vinyl ether unit (0.0001 to 0.05 mass %), based on all monomer units in the modified PTFE, are used to produce a modified PTFE fine powder. Example describes an example in which the modified PTFE fine powder was prepared by copolymerizing TFE, PPVE, and perfluorobutyl ethylene (hereinafter also referred to as "PFBE") at a polymerization pressure of 2.65 MPa by emulsion polymerization using APFO.

PRIOR ART DOCUMENTS

Patent Documents

Patent Document 1: JP-A-H10-53624
Patent Document 2: JP-A-H11-509245

DISCLOSURE OF INVENTION

Technical Problem

However, according to the knowledge of the present inventors, when APFO is changed to a fluorinated emulsifier having a low bioaccumulation property in the method described in Patent Document 1, the moldability at the time of paste extrusion molding and the mechanical property of a molded article may be deteriorated.

In addition, in the method described in Patent Document 2, TFE and the comonomers are copolymerized at a polymerization pressure higher than a general polymerization pressure, and whether or not the modified PTFE fine powder can be produced with a general polymerization pressure is unknown.

The present invention has been made in view of the above circumstances, and it is an object of the present invention to provide a modified PTFE fine powder which is excellent in the moldability by paste extrusion and the mechanical property of the molded article and a method for its production, and a method for producing a tube or a hose by using the modified polytetrafluoroethylene fine powder.

Solution to Problem

The present invention provides a modified polytetrafluoroethylene fine powder and a method for its production, and a method for producing a tube or a hose, as follows.

[1] A modified polytetrafluoroethylene fine powder which is a fine powder of a non-melt-moldable modified polytetrafluoroethylene, characterized in that the modified polytetrafluoroethylene comprises units derived from tetrafluoroethylene, units derived from a perfluoroalkyl vinyl ether represented by the formula (I) and units derived from a perfluoroalkylethylene represented by the formula (II), and that the content of the units derived from the perfluoroalkyl vinyl ether is from 0.1 to 0.25 mass % and the content of the units derived from a perfluoroalkylethylene is from 0.001 to 0.05 mass %, based on all monomer units in the modified polytetrafluoroethylene:

$$CF_2=CFO-C_nF_{2n+1} \quad (I)$$

wherein n is an integer of from 1 to 6,

$$CH_2=CH-C_mF_{2m+1} \quad (II)$$

wherein m is an integer of from 3 to 6.

[2] The modified polytetrafluoroethylene fine powder according to the above [1], which has an average primary particle size of from 0.15 to 0.28 μm.

[3] The modified polytetrafluoroethylene fine powder according to the above [1] or [2], which has a standard specific gravity of from 2.130 to 2.175.

[4] The modified polytetrafluoroethylene fine powder according to any one of the above [1] to [3], wherein the content of the units derived from the perfluoroalkyl vinyl ether is from 0.1 to 0.15 mass %, and the content of the units derived from the perfluoroalkylethylene is from 0.002 to 0.015 mass %, based on all monomer units.

[5] The modified polytetrafluoroethylene fine powder according to the above [1] to [4], wherein the perfluoroalkyl vinyl ether is perfluoropropyl vinyl ether.

[6] The modified polytetrafluoroethylene fine powder according to any one of the above [1] to [5], wherein the perfluoroalkylethylene is perfluorobutylethylene.

[7] A method for producing the modified polytetrafluoroethylene fine powder as defined in any one of the above [1] to [6], characterized by comprising polymerizing tetrafluoroethylene, the perfluoroalkyl vinyl ether and the perfluoroalkylethylene in the presence of an aqueous medium, a polymerization initiator and the following fluorinated emulsifier, and then
obtaining a fine powder from the obtained modified polytetrafluoroethylene aqueous emulsion:
 fluorinated emulsifier: at least one member selected from the group consisting of a fluorinated carboxylic acid with from 4 to 7 carbon atoms, having an etheric oxygen atom, and salts thereof.

[8] The method for producing the modified polytetrafluoroethylene fine powder according to the above [7], wherein a polymerization pressure is from 1.0 to 2.5 MPa.

[9] The method for producing the modified polytetrafluoroethylene fine powder according to the above [7] or [8], wherein the fluorinated emulsifier is an ammonium salt of the fluorinated carboxylic acid.

[10] The method for producing the modified polytetrafluoroethylene fine powder according to any one of the above [7] to [9], wherein the amount of the fluorinated emulsifier to be used is from 1,500 to 20,000 ppm per the yield of the obtained modified polytetrafluoroethylene fine powder.

[11] The method for producing the modified polytetrafluoroethylene fine powder according to any one of the above [7] to [10], wherein tetrafluoroethylene is supplied to a polymerization reactor containing the aqueous medium, the polymerization initiator, the fluorinated emulsifier, the perfluoroalkyl vinyl ether and the perfluoroalkylethylene to carry out polymerization.

[12] A method for producing a tube or a hose, characterized by subjecting the modified polytetrafluoroethylene fine powder as defined in any one of the above [1] to [6] to paste extrusion.

Advantageous Effects of Invention

According to the modified polytetrafluoroethylene fine powder of the present invention, the moldability by paste extrusion and the mechanical property of the molded article are excellent.

According to the method for producing the modified polytetrafluoroethylene fine powder of the present invention, it is possible to produce the modified polytetrafluoroethylene fine powder which is excellent in the moldability by paste extrusion and the mechanical property of the molded article.

According to the method for producing the tube or the hose of the present invention, it is possible to produce the tube or the hose in which the paste extrusion property at the time of production is good and the pressure resistance performance is good.

BRIEF DESCRIPTION OF DRAWING

FIG. 1 is a schematic configuration FIGURE showing an apparatus for measuring the pressure resistance performance of a tube.

DESCRIPTION OF EMBODIMENT

In the present invention, the following terms have the meanings as stated below.

A "modified PTFE" means PTFE obtained by polymerizing TFE with a trace amount of a copolymerizable monomer (comonomer).

The term "non-melt-moldable" means "cannot be melt-molded", namely, having no melting flowability. Specifically, it means having a melt flow rate of less than 0.5 g/10 min as measured in accordance with ASTM D3307 at the measuring temperature of 372° C. and at a load of 49N.

A "unit" means a moiety derived from a monomer, which is present in a polymer and constitutes the polymer. Hereinafter, optionally, a unit derived from each monomer may be referred to by a name having "unit" attached to the monomer name.

A "fine powder" means a powder obtained by coagulating an aqueous emulsion in which fine particles (primary particles) of the modified PTFE obtained by emulsion-copolymerizing TFE with the copolymers, are dispersed.

In the mass of the modified PTFE or the mass of the modified PTFE fine powder, the mass of a residue of a component (for example, an aqueous medium, a polymerization initiator or an emulsifier) other than TFE units and comonomer units is at the level of a trace amount and can be ignored. Therefore, the mass of all monomer units in the modified PTFE is deemed to be equal to the final production amount of the modified PTFE by copolymerizing TFE with the copolymers.

The final production amount of the modified PTFE can be estimated to be substantially equal to the amount of TFE to be consumed in the copolymerization with the copolymers.

An "average primary particle size" means a median size based on volume by measuring a particle size of the modified PTFE fine particles in the modified PTFE aqueous emulsion using a laser scattering method particle size distribution analyzer.

A "standard specific gravity (hereinafter referred to also as "SSG")" is an index for the molecular weight, and the higher the SSG is, the smaller the molecular weight is. The measuring conditions will be described later.

A "paste extrusion pressure" means a pressure required for paste extrusion, when the modified PTFE fine powder prepared into a paste state under a predetermined condition, is extrusion-molded under a predetermined condition. The measuring conditions will be described later.

<Modified PTFE Fine Powder>

The modified PTFE fine powder of the present invention is non-melt-moldable and is a fine powder of the modified PTFE.

The modified PTFE fine powder of the present invention preferably has an average primary particle size of from 0.15 to 0.27 μm, more preferably from 0.2 to 0.27 μm, further preferably from 0.21 to 0.26 μm, and particularly preferably from 0.22 to 0.26 μm.

When the average primary particle size is at least the lower limit value in the above range, the extrusion pressure during the molding is low and a good extrusion moldability can be easily obtained.

Moreover, the smaller the average primary particle size is, the more the stability of the modified PTFE aqueous emulsion improves, however, if too stabilized, the modified PTFE aqueous emulsion hardly coagulates. That is, when the average primary particle size is too small, it is necessary to spend time and labor at the time of applying stirring shearing force to the modified PTFE aqueous emulsion to coagulate the PTFE emulsion to obtain the fine powder, and thereby the production efficiency tends to be lost. On the other hand, if the average primary particle size is too large, not only the time required for sintering during the molding is long, but also the stability of the modified PTFE aqueous emulsion is low. If the stability of the modified PTFE aqueous emulsion is insufficient, many problems may result on the production such that the amount of coagulum increases during the emulsion polymerization, which leads to the low production efficiency, coagulum is formed during a process to transfer the modified PTFE aqueous emulsion, which leads to clogging of pipe lines. When the average primary particle size of the modified PTFE fine powder falls within the above range, it is suitable to prevent such problems, and the modified PTFE aqueous emulsion has a good stability.

The modified PTFE fine powder of the present invention is obtained by using a perfluoroalkyl vinyl ether represented by the following formula (I) (hereinafter referred to also as "monomer (I)") and a perfluoroalkylethylene represented by the following formula (II) (hereinafter referred to also as "monomer (II)"), as comonomers to be copolymerized with TFE. Comonomers other than the monomer (I) and the monomer (I) are not used.

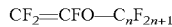
$$CF_2=CFO-C_nF_{2n+1} \quad (I)$$

wherein n is an integer of from 1 to 6,

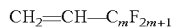
$$CH_2=CH-C_mF_{2m+1} \quad (II)$$

wherein m is an integer of from 3 to 6.

[Monomer (I)]

In the formula (I), $-C_nF_{2n+1}$ is a perfluoroalkyl group wherein the carbon number (n) is from 1 to 6. The perfluoroalkyl group may be linear or branched. The carbon number (n) is preferably from 1 to 3 from the viewpoint of the industrial availability.

PPVE represented by $CF_2=CF-O-C_3F_7$ is particularly preferred, since it is liquid at a normal temperature, and its handling ability is good.

One type of the monomer (I) may be used, or two or more types may be used in combination. PPVE is preferably at least 60 mass %, more preferably at least 80 mass %, particularly preferably 100 mass %, based on the sum of the monomer (I).

[Monomer (II)]

In the formula (II), $-C_mF_{2m+1}$ is a perfluoroalkyl group wherein the carbon number (m) is from 3 to 6. The perfluoroalkyl group may be linear or branched.

PFBE represented by $CH_2=CH-(CF_2)_4F$ is particularly preferred, since the reactivity of the monomer tends to be good, and most of the added amount will be polymerized.

One type of the monomer (II) may be used, or two or more types may be used in combination. PFBE is preferably at least 60 mass %, more preferably at least 80 mass %, particularly preferably 100 mass %, based on the sum of the monomer (II).

[Content of Comonomer Units]

The content of the monomer (I) units is preferably from 0.1 to 0.25 mass %, more preferably from 0.1 to 0.2 mass %, further preferably from 0.1 to 0.18 mass %, more further preferably from 0.1 to 0.15 mass %, based on all monomer units in the modified PTFE. When the content of the monomer (I) units is at least the lower limit value in the above range, a product after sintering tends to have a good transparency. When the content of the monomer (I) units is at most the upper limit value, the polymerization time will not be too long.

The content of the monomer (II) units is preferably from 0.001 to 0.1 mass %, more preferably from 0.001 to 0.05 mass %, further preferably from 0.002 to 0.02 mass %, furthermore preferably from 0.002 to 0.015 mass %, based on all monomer units in the modified PTFE. When the content of the monomer (II) units is at least the lower limit value in the above range, the average primary particle size of the modified PTFE fine powder is easily controlled. When the content of the monomer (II) units is at most the upper limit value, the average primary particle size of the final product (i.e. the modified PTFE fine powder) is not too small and tends to have a good heat resistance.

The sum of the contents of the comonomer units may be set so that the modified PTFE fine powder would have a non-melt-moldability. Particularly from the viewpoint of maintaining the non-melt-moldability, the sum of the contents of the comonomer units is preferably at most 0.3 mass %, more preferably at most 0.2 mass %, further preferably at most 0.15 mass %.

When the sum of the contents of the comonomer units is too large, the average primary particle size will be too small and the extrusion pressure during the molding will be high and the stability of the modified PTFE aqueous emulsion will be too high. When the sum of the contents of the comonomer units falls within the above range, the stability of the modified PTFE aqueous emulsion is moderate and the coagulum of the fine particles of the modified PTFE can be easily controlled and the modified PTFE fine powder having a good extrusion moldability can be easily obtained.

[Specific Gravity (SSG)]

The modified PTFE of the present invention has SSG of preferably from 2.130 to 2.175, more preferably from 2.135 to 2.175, further preferably from 2.135 to 2.165.

The small value of SSG means that the molecular weight of the modified PTFE is large and the amount of comonomers to be added is large. On the other hand, the large value of SSG means that the molecular weight is small. When the molecular weight is too small, the mechanical property of the final product tends to decrease. When SSG of the modified PTFE falls under the above range, the final product tends to have a good mechanical property.

SSG of the modified PTFE can be controlled by polymerization conditions such as the amount of comonomers to be added and the polymerization pressure at the time of polymerizing TFE and comonomers.

[Paste Extrusion Pressure]

The paste extrusion pressure of the modified PTFE fine powder of the present invention is preferably from 20 to 50 MPa, more preferably from 25 to 45 MPa. When the paste extrusion pressure is at least the lower limit value in the above range, the final product after sintering tends to have a good mechanical strength. On the other hand, if the paste extrusion pressure is too high, an appearance defect such as a surface roughness of the final product may result. When the paste extrusion pressure is at most the upper limit value in the above range, the final product tends to have a good appearance.

The modified PTFE fine powder of the present invention is suitable for a long size material to be manufactured through steps of a continuous extrusion molding by a paste extrusion molding method, followed by sintering. As the long size material, a hose or a tube may be mentioned.

The modified PTFE fine powder of the present invention is suitable for the use for production of a tube or a hose.
<Method for Producing Modified PTFE Fine Powder>

The modified PTFE fine powder of the present invention can be produced by using the modified PTFE aqueous emulsion obtained by an emulsion polymerization method.

The method for producing the modified PTFE fine powder of the present invention is characterized by polymerizing TFE, the monomer (I) and the monomer (II) in the presence of an aqueous medium, a polymerization initiator and a fluorinated emulsifier.

TFE is continuously or intermittently added to a polymerization reactor.

The comonomers may be collectively added at the time of initiating the polymerization or may be dividedly supplied.
[Aqueous Medium]

The aqueous medium may, for example, be water or a mixture of water and an aqueous organic solvent.

The aqueous organic solvent is preferably an aqueous alcohol such as tert-butanol, propylene glycol, dipropylene glycol, dipropylene glycol monomethyl ether or tripropylene glycol.

When the aqueous medium contains the aqueous organic solvent, the content of the aqueous organic solvent is preferably from 1 to 40 parts by mass, more preferably from 3 to 30 parts by mass, based on 100 parts by mass of water.
[Fluorinated Emulsifier]

As the fluorinated emulsifier, at least one member selected from the group consisting of a fluorinated carboxylic acid with from 4 to 7 carbon atoms, having an etheric oxygen atom and salts thereof, can be used. Such a fluorinated emulsifier has an etheric oxygen atom and a low molecular weight and is therefore considered to have a low residual nature and a low bioaccumulation property.

The fluorinated carboxylic acid is a compound having an etheric oxygen atom in a $C_{4-7}$ carbon chain (main chain) and having —COOH at a terminal. —COOH at a terminal may form a salt. The etheric oxygen atom in the main chain is at least 1, preferably from 1 to 4, more preferably 2 to 3.

The fluorinated carboxylic acid is preferably a perfluoromonoxaalkanoic acid, a perfluoropolyoxaalkanoic acid having 2 to 4 carbon atoms substituted with an etheric oxygen atom, or a carboxylic acid in which 1 to 3 of fluorine atoms of these alkanoic acids is substituted by a hydrogen atom. Incidentally, the number of carbon atoms of these carboxylic acids does not include a carbon atom substituted by an oxygen atom.

As preferred specific examples of the fluorinated carboxylic acid, $C_3F_7OCF_2CF_2OCF_2COOH$, $C_2F_5OCF(CF_3)CF_2OCHFCOOH$, $CF_3OCF_2OCF_2OCF_2OCF_2COOH$, $CF_3O(CF_2CF_2O)_2CF_2COOH$, $CF_3CF_2O(CF_2)_4COOH$, $CF_3CFHO(CF_2)_4COOH$, $CF_3OCF(CF_3)CF_2OCF(CF_3)COOH$, $CF_3O(CF_2)_3OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2COOH$, $C_3F_7OCHFCF_2COOH$, $C_3F_7OCF(CF_3)COOH$, $CF_3CFHO(CF_2)_3COOH$, $CF_3OCF_2CF_2OCF_2COOH$, $C_2F_5OCF_2CF_2COOH$, $C_3F_7OCHFCOOH$ and $CF_3OCF_2CF_2COOH$, may be mentioned.

As more preferred specific examples, $CF_3OCF(CF_3)CF_2OCF(CF_3)COOH$, $C_2F_5OCF_2CF_2OCF_2COOH$, $CF_3O(CF_2)_3OCHFCF_2COOH$, $C_3F_7OCF_2CF_2COOH$ and $C_3F_7OCF(CF_3)COOH$, may be mentioned.

Examples of salts of the fluorinated carboxylic acid include an alkali metal salt and an ammonium salt of the fluorinated carboxylic acid, and specific examples thereof include Li salt, Na salt, K salt, $NH_4$ salt and the like.

Particularly preferably, it is an ammonium salt ($NH_4$ salt) of the fluorinated carboxylic acid. The ammonium salt of the fluorinated carboxylic acid is excellent in the solubility in an aqueous medium and a metal ion component unlikely remains as impurities in the PTFE fine powder or the final product.

The amount of the fluorinated emulsifier to be used is preferably from 1,500 to 20,000 ppm, more preferably from 2,000 to 20,000 ppm, further preferably from 2,000 to 15,000 ppm, based on the final yield of the modified PTFE.

When the amount of the fluorinated emulsifier to be used is at least the lower limit value in the above range, the stability of the modified PTFE aqueous emulsion tends to be good during the polymerization. If the amount of the fluorinated emulsifier to be used exceeds the upper limit value in the above range, the stability of the modified PTFE aqueous emulsion cannot be obtained in proportional to the amount to be used.
[Polymerization Initiator]

As the polymerization initiator, a known radical polymerization initiator to be used for the emulsion polymerization of TFE may be used. For example, a water-soluble radical polymerization initiator, a water-soluble redox catalyst, etc. may be mentioned.

As the water-soluble radical polymerization initiator, a water-soluble persulfate such as ammonium persulfate or potassium persulfate, or a water-soluble organic peroxide such as disuccinic acid peroxide, bis glutaric acid peroxide or tert-butyl hydroperoxide, is preferred.

As the water-soluble redox catalyst, preferred is a combination of an oxidizing agent such as bromic acid or its salt, chloric acid or its salt, persulfuric acid or its salt, permanganic acid or its salt, or hydrogen peroxide, and a reducing agent such as sulfurous acid or its salt, hydrogen sulfurous acid or its salt, thiosulfuric acid or its salt, or an organic acid. Specific examples of the water-soluble redox catalyst include potassium permanganate/oxalic acid, potassium bromate/ammonium sulfite, and the like.

As the polymerization initiator, one type may be used alone, or two or more types may be used in combination.

As the polymerization initiator, it is preferable to use persulfate and disuccinic acid peroxide in combination, particularly from the viewpoint of maintaining the stability of the emulsion during polymerization. Specific examples thereof include ammonium persulfate/disuccinic acid peroxide and the like.

The amount of the polymerization initiator to be used is preferably from 0.0005 to 0.20 mass %, more preferably from 0.001 to 0.15 mass %, based on the final yield of the modified PTFE.
[Stabilizing Aid]

For the emulsion polymerization of TFE, it is preferred to further comprise a stabilizing aid.

The stabilizing aid is preferably a paraffin wax, a fluorinated oil, a fluorinated solvent or a silicone oil. As the stabilizing aid, one type may be used alone, or two or more types may be used in combination.

As the stabilizing aid, the paraffin wax is particularly preferred. The paraffin wax may be liquid, semisolid or solid at room temperature and is preferably a saturated hydrocarbon having at least 12 carbon atoms. The melting point of the paraffin wax is preferably from 40 to 65° C., more preferably from 50 to 65° C.

The amount of the stabilizing agent to be used is preferably from 0.1 to 12 mass %, more preferably from 0.1 to 8 mass % per the aqueous medium to be used.

When the amount of the stabilizing aid to be used is at least the lower limit value in the above range, the modified PTFE aqueous emulsion tends to have a good stability during the polymerization. If the stability of the modified PTFE aqueous emulsion during the polymerization is impaired, a large amount of coagulum may be formed.

When the amount of the stabilizing aid to be used is at most the upper limit value, the stabilizing aid can be easily separated and removed after the polymerization.

[Polymerization Process]

In the polymerization process, TFE, the monomer (I) and the monomer (II) are polymerized in the presence of the aqueous medium, the polymerization initiator and the fluorinated emulsifier to obtain the modified PTFE aqueous emulsion. The monomer (II) has a reactivity sufficient to co-polymerize with TFE.

As the method of adding the monomer (I) and the monomer (II), preferred is a method (initial one time addition of the comonomers) of charging the total amount to a polymerization reactor before starting the polymerization reaction. Specifically, preferred is a method comprising preliminary charging the aqueous medium, the fluorinated emulsifier, the stabilizing aid, the monomer (I) and the monomer (II) to a polymerization reactor and then supplying TFE and the polymerization initiator to initiate the polymerization reaction.

TFE is preferably supplied to the polymerization reactor continuously or intermittently.

The solid content concentration of the modified PTFE aqueous emulsion is preferably from 10 to 45 mass %, more preferably from 15 to 45 mass %, further preferably from 20 to 43 mass %. When the solid content concentration falls within the above range, the target particles can be efficiently and easily coagulated in the subsequent coagulation process.

Here, the solid content concentration means the ratio of the solid content remaining after drying the modified PTFE aqueous emulsion at 120° C. for 2 hours to the modified PTFE aqueous emulsion. In the production method of the present invention, it can be said that the solid content concentration indicates the mass % of the formed modified PTFE, since the amount of the fluorinated emulsifier used is very small. Furthermore, since the amount of comonomer units in the modified PTFE is also extremely small, it can be estimated that it is approximately equal to the amount of the polymerized TFE.

The average primary particle size of the modified PTFE fine powder is measured by using the modified PTFE aqueous emulsion obtained in the polymerization process prior to the coagulation process as a sample.

[Polymerization Condition]

The polymerization temperature is preferably from 10 to 95° C., more preferably from 15 to 90° C., particularly preferably from 20 to 90° C.

The polymerization pressure is preferably from 1.0 to 2.5 MPa, more preferably from 1.4 to 2.2 MPa. When the polymerization pressure is at least the lower limit value in the above range, the polymerization reaction is rapidly initiated. When the polymerization pressure is at most the upper limit value in the above range, the polymerization reaction rate can appropriately obtained.

The polymerization time is preferably from 100 to 520 minutes, more preferably from 110 to 450 minutes.

[Coagulation Process]

A fine powder can be produced by a known method from the modified PTFE aqueous emulsion obtained by the polymerization process.

Preferably, for example, the modified PTFE aqueous emulsion obtained by the polymerization process is, as a case requires, diluted with water so as to have a solid content concentration of from 10 to 20 mass %, followed by vigorously stirring for coagulation with a stirring blade. Here, as a case requires, the pH may be adjusted. Further, a coagulation aid such as an electrolyte or an aqueous organic solvent may be added.

Thereafter, the coagulated fine particles are moderately stirred to be removed from water, and as a case requires, the obtained wet powder is granulated and sieved, followed by drying. Then, the modified PTFE fine powder is obtained.

The drying is carried out under a state that the wet powder is not flowed so much, preferably carried out under a state that the wet powder is left to stand.

As the drying method, vacuum drying, radio-frequency drying and hot air drying may be mentioned. The drying temperature is preferably from 100 to 250° C., more preferably from 100 to 200° C.

<Hose or Tube>

The tube or the hose of the present invention is a tube or a hose formed using the modified PTFE fine powder of the present invention.

Both the tube and the hose are tubular and there is no clear distinction between them. The thickness of the tube or the hose is not particularly limited, but the outer diameter is preferably from 5 to 30 mm, more preferably from 7 to 20 mm. The thickness (wall thickness) is preferably 0.5 to 2.0 mm, more preferably 0.5 to 1.5 mm.

As the method for producing the hose or the tube by using the modified PTFE fine powder of the present invention, a method comprising forming the hose or the tube by a paste extrusion molding method and then drying and sintering is employed.

The paste extrusion molding is a method comprising mixing the modified PTFE fine powder and a lubricant to prepare a mixture having a flowability, followed by an extrusion molding.

The lubricant is preferably naphtha or a petroleum hydrocarbon having a dry point of at least 100° C.

An additive such as a pigment may be added to the mixture for coloring, and various fillers may be added for improving strength, antistatic property, conductivity, etc.

The blend proportion of the lubricant may be appropriately selected so that the modified PTFE fine powder would have a flowability, and for example, the lubricant is preferably from 10 to 30 mass %, particularly preferably from 15 to 20 mass % per the total amount of the modified PTFE fine powder and the lubricant.

After the extrusion molding, a removing process to remove the lubricant and a sintering process are usually carried out by known methods.

The inventors of the present invention have variously examined the reason why the moldability during the paste extrusion molding and the mechanical property of the molded article decrease when the emulsifier in the method described in the above Patent Document 1 is changed to a fluorine-containing emulsifier having low bioaccumulation property. As a result, the inventors have found that the above-mentioned problem occurs when the particle size of the modified PTFE fine powder is increased by changing the emulsifier.

As shown in Examples described later, according to the present invention, in a system for producing the modified PTFE fine powder by copolymerizing TFE and the comonomers, the use of a specific amount of the monomer (II) as a part of the comonomers makes it possible to control the average primary particle diameter of the modified PTFE fine powder within a specific range, although the reason is not clear.

The molded article produced using the modified PTFE fine powder is excellent in its mechanical property, particularly excellent in the pressure resistance performance of the hose or the tube.

Moreover, it prevents from forming an abnormality such as whitening at the time of sintering. In particular, when the hose or the tube is used in a state of being transparent or colored to a predetermined color tone, it is important that an appearance abnormality such as whitening does not occur at the time of sintering.

Furthermore, when a specific amount of the monomer (II) is used as a part of the comonomers, the standard specific gravity (SSG) is maintained and the production of the fine powder and the paste extrusion moldability are not impaired.

EXAMPLES

Now, the present invention will be described in detail with reference to Examples. However, the present invention is by no means restricted thereto.

[Measuring Methods]

(A) Average Primary Particle Size of Modified PTFE Fine Powder (Unit: μm)

As to the modified PTFE aqueous emulsion, the average primary particle size was measured by a method for measuring an average primary particle size using a laser scattering particle size distribution analyzer (tradename "LS230", manufactured by Coulter Co., Ltd.).

(B) Standard Specific Gravity (SSG) of Modified PTFE Fine Powder

SSG was measured in accordance with ASTM D1457-10 and D4895-10. 12.0 g of a modified PTFE fine powder was weighed and held in a cylindrical mold having an inner diameter of 28.6 mm for two minutes under 34.5 MPa to prepare a molded sample. The molded sample was put in an oven of 290° C. and heated at a rate of 120° C./hr. After being held at 380° C. for 30 minutes, the molded sample was cooled at a rate of 60° C./hr and held at 294° C. for 24 minutes. Then, the molded sample was held in a desiccator of 23° C. for 12 hours, and the mass of the molded sample at 23° C. in air and the mass in water were measured. The specific gravity value of the molded sample to water at 23° C. was obtained. The obtained value was multiplied by the density value of water at 23° C. to obtain a value of standard specific gravity.

(C) Paste Extrusion Pressure

The paste extrusion pressure was measured by the method described in ASTM4895-10, section 10.8. 200 g of a modified PTFE fine powder which was left at room temperature for at least 2 hours, was put into a glass bottle having an internal capacity of 900 cc, and 60 mL of a lubricant (trade name "Multipar H", manufactured by Multisol) was added, followed by mixing for 25 minutes to obtain a PTFE fine powder mixture. The obtained PTFE fine powder mixture was left in a constant temperature chamber at 30° C. for 2 hours, then molded into a preform at 100 psi (mass pound/inch$^2$) and then subjected to paste extrusion through an orifice having a diameter of 1.59 mm, a land length of 4.78 mm and a cone angle of 30°, at 25° C. under conditions of a reduction ratio (ratio of the cross-section of the inlet to the cross-section of the outlet of the die) of 400:1 and an extrusion rate of 18 mm/min, to obtain an extruded bead (string). The pressure required for the extrusion at that time was measured, and it was designated as the paste extrusion pressure.

(D) Measurement of Contents of Comonomer Units

A modified PTFE fine powder was left at room temperature (from 18 to 25° C.) for at least 2 hours to dry. 0.01 g of the dried modified PTFE fine powder was put in a mold having an inner diameter of 3 mm and a height of 3 mm and pressed by hand press for 30 seconds to prepare a sample to be measured.

The infrared absorption spectrum of the sample to be measured was measured by means of a Fourier transform infrared spectrophotometer (FT-IR, product name: FT/IR4100, manufactured by JASCO Corporation).

The content of the PPVE units in all monomer units is a value (mass %) obtainable by multiplying a ratio of the absorption of infrared absorption band at 935 cm$^{-1}$ to the absorption at 993 cm$^{-1}$ by the coefficient of the conversion factor 0.135.

The content of the PFBE units in all monomer units was calculated by a solid $^{19}$F-NMR method. A 400 MHz NMR apparatus was used, the sample rotation number was set to 30 KHz, the flip angle was set to 45°, the pulse repetition waiting time was set to 4 seconds, and the accumulation number was set to 500 times or more. The compositional ratio of the TFE units to the PFBE units was calculated from the ratio of the peak intensity derived from $CF_3$ of the PFBE units (detected in the vicinity of −81 ppm) and the peak intensity derived from $CF_2$ (detected in the vicinity of −120 ppm) in the obtained $^{19}$F-NMR spectrum.

The calculation formulae are mentioned in detail below.

Content of TFE units=$3(A-2B)/(3A-2B)$

Content of PFBE units=$4B/(3A-2B)$

Here, considering the chemical shift in a case where the main chain $CF_2$ in PTFE is −120 ppm, A and B are calculated as the following integrated values.

A=an integrated value within a range of from −95 to −145 ppm+an integrated value of spinning side bands The spinning side bands were integrated under a condition having no problem for calculating peaks in general.

B=an integrated value within a range of from −80 to −85 ppm (E) Tube appearance (1) Method for Producing Pre-Molded Body 18 parts by mass of a hydrocarbon oil (VM & P naphtha) as a lubricant aid was added to 100 parts by mass of a modified PTFE fine powder and mixed, and the mixture was allowed to stand at 25° C. for 24 hours for maturing. After maturing, it was placed in a metal mold and pressed at 3.4 MPa for 10 minutes to obtain a cylindrical pre-molded body.

(2) Method for Molding Tube

The obtained pre-molded body was inserted into an extruder having a cylinder inner diameter of 114.3 mm, a mandrel outer diameter of 19.05 mm, a die diameter of 8.89 mm, a core pin diameter of 7.37 mm, and a die angle of 30°, and the die front edge portion was heated to 50° C. Subsequently, the tubular material extruded from the extruder at 0.5 m/min was dried and sintered to produce a tube molded article. Drying was carried out by a method in which the tubular material was passed through a drying furnace having a length of 3.2 m set at 135° C. for a residence time of 8 minutes and thereafter it was continuously passed through a sintering furnace having a length of 1.5 m set at 450° C. for a residence time of 3.75 minutes and sintered to obtain the tube molded article.

(F) Measurement of Solid Content Concentration 7 to 8 g of a modified PTFE aqueous emulsion was weighed in an aluminum dish whose mass was measured beforehand and heated at 120° C. for 2 hours to evaporate water content. Subsequently, the mass of the aluminum dish containing the solid content remaining on the aluminum dish was measured. The solid content concentration was calculated by dividing the mass of the solid content by the mass of the aqueous emulsion used.

(3) Evaluation Method

The appearance of the obtained tube molded article was visually observed, and it was judged as "○ (good)" if it was transparent and uniform appearance. When the appearance was not uniform (for example, whitening was observed), it was judged as "×(bad)".

(F) Pressure Resistance Performance of Tube (Burst Pressure Measurement Method)

A tube molded article was produced in the same manner as the (1) and (2) of (E) above, and the bursting pressure was measured using the measuring apparatus shown in FIG. 1. In FIG. 1, the reference numeral 1 is a tube molded article which is an object to be measured; 2, 3 are water pressure resistance couplings; 4 is an air vent valve; 5 is a relief coupling; 6 is a hydraulic pump; 7 is a pressure sensor; and 8 is pure water injection valve. This measuring apparatus is installed in a chamber (not shown) adjusted to 23±2° C., and the pure water used for pressure measurement is also maintained at the same temperature.

Specifically, both end portions of the tube molded article 1 cut to 250 mm are set on the upper and lower water pressure resistance couplings 2 and 3, respectively. After the air vent valve 4 is opened and the inside of the tube molded article 1 is filled with pure water by the hydraulic pump 6, the air vent valve 4 is closed to make the inside of the system sealed. The inside of the system is continuously pressurized with the hydraulic pump 6 at a pressure increase rate by 1 Bar/sec, and the maximum stress at bursting of the tube molded article 1 is recorded as the burst pressure (unit: Bar).

Example 1

2.09 kg of a 30 mass % aqueous solution of $C_2F_5OC_2F_4OCF_2COONH_4$ (ammonium perfluoro-3,6-dioxaoctanoate, hereinafter referred to "APFDO") as an emulsifier, 25 kg of paraffin wax as a stabilizing aid and 2,490 L of deionized water were charged into a 4,000 L-stainless steel autoclave equipped with a stirrer.

The inside of the autoclave was flushed with nitrogen and then depressurized, and 60 g of PFBE and 1,810 g of PPVE were charged. Then, the autoclave was pressurized with TFE, and the temperature was raised to 71° C. with stirring.

Subsequently, the pressure was increased to 18.62 bar (1.86 MPa) with TFE, and, as polymerization initiators, 13.1 g of ammonium persulfate and 200 g (70 mass % solid content) of disuccinic acid peroxide were dissolved in 50 liters of deionized water and injected to initiate the polymerization reaction.

Then, the polymerization was allowed to proceed while adding TFE so as to maintain the autoclave internal pressure at 18.62 bar (1.86 MPa). During the polymerization, 23.32 kg of a 30 mass % aqueous solution of APFDO was added. When the added amount of TFE after the initiation of the polymerization reached 1,140 kg, the reaction was terminated, and TFE in the autoclave was discharged. The polymerization time was 162 minutes.

The obtained modified PTFE aqueous emulsion was cooled, and the supernatant paraffin wax was removed. The solid content concentration of the modified PTFE aqueous emulsion was about 30 mass %. Also, the coagulum in the reactor was present in a trace amount.

In this example, the total amount of APFDO used was 7,623 g with respect to the final yield of 1,140 kg of modified PTFE, and the total amount of APFDO used was 6,687 ppm with respect to the final yield of modified PTFE.

Also, the amount of the stabilizing aid used was 25 kg with respect to 2,490 liters of deionized water, and the amount of the stabilizing aid used was 1.00 mass % with respect to the aqueous medium used.

The average primary particle size of the PTFE fine particles in the obtained modified PTFE aqueous emulsion was measured. The results are shown in Table 1.

The modified PTFE aqueous emulsion was diluted to a concentration of 10 mass % with deionized water, adjusted to 23° C., agitated and coagulated to obtain a wet powder. Next, this wet powder was dried at 160° C. to obtain the modified PTFE fine powder.

A tube molded article having an inner diameter of 7.24 mm and an outer diameter of 8.76 mm was produced by the method described in the (E) above.

SSG, the paste extrusion pressure, the content of each monomer and the average primary particle size were measured by the above methods, and the appearance of the tube and the pressure resistance performance of the tube were evaluated by the above methods. The results are shown in Table 1.

Example 2

A polymerization reaction was carried out in the same manner as in Example 1 except that the added amount of PFBE was changed to 460 g in Example 2 to produce a modified PTFE aqueous emulsion. The polymerization time was 212 minutes. The solid content concentration of the modified PTFE aqueous emulsion was about 30 mass %.

The modified PTFE aqueous emulsion was treated in the same manner as in Example 1 to obtain a wet powder and further dried to obtain a modified PTFE fine powder.

A tube molded article having an inner diameter of 7.24 mm and an outer diameter of 8.76 mm was produced in the same manner as in Example 1. It was evaluated in the same manner as in Example 1, and the results are shown in Table 1.

Example 3

A polymerization reaction was carried out in the same manner as in Example 1 except that the added amount of PFBE was changed to 915 g in Example 3 to produce a modified PTFE aqueous emulsion. The polymerization time was 238 minutes. The solid content concentration of the modified PTFE aqueous emulsion was about 30 mass %.

The modified PTFE aqueous emulsion was treated in the same manner as in Example 1 to obtain a wet powder and further dried to obtain a modified PTFE fine powder.

A tube molded article having an inner diameter of 7.24 mm and an outer diameter of 8.76 mm was produced in the same manner as in Example 1. It was evaluated in the same manner as in Example 1, and the results are shown in Table 1.

Comparative Example 1

A polymerization reaction was carried out in the same manner as in Example 1 except that PFBE was not added in Example 1 to produce a modified PTFE aqueous emulsion. The polymerization time was 150 minutes. The solid content concentration of the modified PTFE aqueous emulsion was about 30 mass %.

The modified PTFE aqueous emulsion was treated in the same manner as in Example 1 to obtain a wet powder and further dried to obtain a modified PTFE fine powder.

A tube molded article having an inner diameter of 7.23 mm and an outer diameter of 8.75 mm was produced in the same manner as in Example 1. It was evaluated in the same manner as in Example 1, and the results are shown in Table 1.

TABLE 1

| | | Example 1 | Example 2 | Example 2 | Comparative Example 1 |
|---|---|---|---|---|---|
| Content in all monomer units [mass %] | TFE units | 99.865 | 99.83 | 99.79 | 99.87 |
| | Monomer (I) (PPVE) units | 0.13 | 0.13 | 0.13 | 0.13 |
| | Monomer (II) (PFBE) units | 0.005 | 0.04 | 0.08 | — |
| | Sum | 100 | 100 | 100 | 100 |
| Average primary particle size [μm] | | 0.23 | 0.21 | 0.20 | 0.28 |
| Standard specific gravity (SSG) | | 2.145 | 2.147 | 2.149 | 2.145 |
| Paste extrusion pressure [MPa] | | 32 | 37 | 35 | 29 |
| Extruded tube appearance after sintering | | Good | Good | Good | Slight whitening |
| Tube pressure resistance performance [Bar] | | 38 | 40 | 38 | 32 |

As shown in the results of Table 1, the average primary particle size of the modified PTFE fine powder of Comparative Example 1 in which the monomer (II) (PFBE) was not added was 0.280 μm, whereas in Example 1 in which the monomer (II) (PFBE) was added, the average primary particle size of the modified PTFE fine powder was as small as 0.234 μm.

The standard specific gravity (SSG) of the modified PTFE fine powder of Example 1 was equivalent to that of Comparative Example 1, and the paste extrusion pressure for evaluating the paste extrusion moldability of Example 1 was also comparable to that of Comparative Example 1.

As to the evaluation of the appearance of the extruded tube after sintering, the extruded tube of Example 1 was transparent and uniform in appearance after sintering, and there was no problem. On the other hand, the extruded tube of Comparative Example 1 showed whitening on the appearance. The pressure resistance performance of the tube was larger in Example 1 than in Comparative Example 1.

INDUSTRIAL APPLICABILITY

The modified polytetrafluoroethylene fine powder of the present invention can be widely used for a variety of molded article materials such as tubes or hoses.

This application is a continuation of PCT Application No. PCT/JP2016/076030, filed on Sep. 5, 2016, which is based upon and claims the benefit of priority from Japanese Patent Application No. 2015-176810 filed on Sep. 8, 2015. The contents of those applications are incorporated herein by reference in their entireties.

DESCRIPTION OF SYMBOLS

1: tube molded article;
2, 3: water pressure resistance couplings;
4: air vent valve;
5: relief coupling;
6: hydraulic pump;
7: pressure sensor;
8: pure water injection valve

What is claimed is:

1. A modified polytetrafluoroethylene fine powder which is a fine powder of a non-melt-moldable modified polytetrafluoroethylene, characterized in that the modified polytetrafluoroethylene comprises units derived from tetrafluoroethylene, units derived from a perfluoroalkyl vinyl ether represented by the formula (I) and units derived from a perfluoroalkylethylene represented by the formula (II), and that the content of the units derived from the perfluoroalkyl vinyl ether is from 0.1 to 0.25 mass % and the content of the units derived from a perfluoroalkylethylene is from 0.001 to 0.1 mass %, based on all monomer units in the modified polytetrafluoroethylene:

$$CF_2=CFO-C_nF_{2n+1} \quad (I)$$

wherein n is an integer of from 1 to 6, $$CH_2=CH-C_mF_{2m+1} \quad (II)$$

wherein m is an integer of from 3 to 6,
wherein the modified polytetrafluoroethylene fine powder has a standard specific gravity of from 2.135 to 2.165.

2. The modified polytetrafluoroethylene fine powder according to claim 1, which has an average primary particle size of from 0.15 to 0.28 μm.

3. The modified polytetrafluoroethylene fine powder according to claim 1, wherein the content of the units derived from the perfluoroalkyl vinyl ether is from 0.1 to 0.15 mass %, and the content of the units derived from the perfluoroalkylethylene is from 0.002 to 0.015 mass %, based on all monomer units.

4. The modified polytetrafluoroethylene fine powder according to claim 1, wherein the perfluoroalkyl vinyl ether is perfluoropropyl vinyl ether.

5. The modified polytetrafluoroethylene fine powder according to claim 1, wherein the perfluoroalkylethylene is perfluorobutylethylene.

6. A method for producing the modified polytetrafluoroethylene fine powder according to claim 1, characterized by comprising
polymerizing tetrafluoroethylene, the perfluoroalkyl vinyl ether and the perfluoroalkylethylene in the presence of an aqueous medium, a polymerization initiator and the following fluorinated emulsifier, and then
obtaining a fine powder from the obtained modified polytetrafluoroethylene aqueous emulsion:
fluorinated emulsifier: at least one member selected from the group consisting of a fluorinated carboxylic acid with from 4 to 7 carbon atoms, having an etheric oxygen atom, and salts thereof.

7. The method for producing the modified polytetrafluoroethylene fine powder according to claim 6, wherein a polymerization pressure is from 1.0 to 2.5 MPa.

8. The method for producing the modified polytetrafluoroethylene fine powder according to claim 6, wherein the fluorinated emulsifier is an ammonium salt of the fluorinated carboxylic acid.

9. The method for producing the modified polytetrafluoroethylene fine powder according to claim 6, wherein the amount of the fluorinated emulsifier to be used is from 1,500 to 20,000 ppm per the yield of the obtained modified polytetrafluoroethylene fine powder.

10. The method for producing the modified polytetrafluoroethylene fine powder according to claim 6, wherein tetrafluoroethylene is supplied to a polymerization reactor containing the aqueous medium, the polymerization initiator, the fluorinated emulsifier, the perfluoroalkyl vinyl ether and the perfluoroalkylethylene to carry out polymerization.

11. A method for producing a tube or a hose, characterized by subjecting the modified polytetrafluoroethylene fine powder as defined in claim 1 to paste extrusion.

\* \* \* \* \*